(12) United States Patent
Hayashi

(10) Patent No.: US 11,472,366 B2
(45) Date of Patent: Oct. 18, 2022

(54) HEAD PROTECTION AIRBAG DEVICE

(71) Applicant: TOYODA GOSEI CO., LTD., Kiyosu (JP)

(72) Inventor: Shinji Hayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/207,944

(22) Filed: Mar. 22, 2021

(65) Prior Publication Data

US 2021/0300279 A1 Sep. 30, 2021

(30) Foreign Application Priority Data

Mar. 27, 2020 (JP) ............................. JP2020-058917

(51) Int. Cl.

| B60R 21/232 | (2011.01) |
|---|---|
| B60R 21/237 | (2006.01) |
| B60R 21/213 | (2011.01) |
| B60R 21/2338 | (2011.01) |
| B60R 21/00 | (2006.01) |

(52) U.S. Cl.
CPC .......... *B60R 21/232* (2013.01); *B60R 21/213* (2013.01); *B60R 21/237* (2013.01); *B60R 21/2338* (2013.01); *B60R 2021/0006* (2013.01); *B60R 2021/0048* (2013.01); *B60R 2021/0067* (2013.01); *B60R 2021/23386* (2013.01)

(58) Field of Classification Search
CPC .... B60R 2021/0006; B60R 2021/0048; B60R 2021/0067; B60R 2021/23316; B60R 2021/23386; B60R 21/213; B60R 21/232; B60R 21/2338; B60R 21/237
See application file for complete search history.

(56) References Cited

U.S. PATENT DOCUMENTS

| 6,176,515 | B1 * | 1/2001 | Wallner | ............... B60R 21/2338 |
|---|---|---|---|---|
| | | | | 280/730.2 |
| 6,237,939 | B1 * | 5/2001 | Resh | ..................... B60R 21/232 |
| | | | | 280/730.2 |
| 6,273,458 | B1 * | 8/2001 | Steffens, Jr. | ........ B60R 21/2338 |
| | | | | 280/730.2 |

(Continued)

FOREIGN PATENT DOCUMENTS

| JP | 2000-355261 A | | 12/2000 |
|---|---|---|---|
| JP | 2007145333 A | * | 6/2007 |
| JP | 2016088267 A | * | 5/2016 |

*Primary Examiner* — Laura Freedman
(74) *Attorney, Agent, or Firm* — Posz Law Group, PLC

(57) ABSTRACT

The airbag includes a bag body that deploys and inflates to cover the interior side of the window, and a strap having an upper end attached to an upper window frame, a lower end attached to a lateral frame, and an intermediate portion connected to the body. The strap has an insertion portion, which is inserted through the insertion hole of the body, on the intermediate portion, so that the part from the upper end to the insertion portion is an outer side portion, which is placed on the outside of the body in the inflated state, and the part from the insertion portion to the lower end is an inner side portion. When the inflation of the body is completed, the inner side portion is pressed to the inside of the vehicle by the front edge side inflation portion, and generates tension in the strap and the body.

5 Claims, 11 Drawing Sheets

(56) References Cited

U.S. PATENT DOCUMENTS

| | | | |
|---|---|---|---|
| 6,367,836 B1 * | 4/2002 | Tanase | B60R 21/2338 280/730.2 |
| 6,375,216 B1 * | 4/2002 | Eschbach | B60R 21/2338 280/730.2 |
| 6,464,250 B1 * | 10/2002 | Faigle | B60R 21/232 280/730.2 |
| 6,505,853 B2 * | 1/2003 | Brannon | B60R 21/232 280/730.2 |
| 6,695,347 B2 * | 2/2004 | Sonnenberg | B60R 22/195 280/730.2 |
| 6,945,558 B2 * | 9/2005 | Hall | B60R 21/232 280/730.2 |
| 8,360,469 B2 * | 1/2013 | Wiik | B60R 21/23138 280/730.2 |
| 8,894,094 B2 * | 11/2014 | Wang | B60R 21/2338 280/730.2 |
| 9,067,563 B2 * | 6/2015 | Okuhara | B60R 21/2338 |
| 9,199,600 B2 * | 12/2015 | Kawamura | B60R 21/237 |
| 2010/0013203 A1 | 1/2010 | Mitchell et al. | |

* cited by examiner

HEAD PROTECTION AIRBAG DEVICE

CROSS-REFERENCE TO RELATED APPLICATIONS

The present application claims the benefit of priority of Japanese Patent Application No. 2020-058917, filed on Mar. 27, 2020, the content of which is incorporated herein by reference.

TECHNICAL FIELD

The present invention relates to a head protection airbag device in which an airbag stored on an upper edge side of a window on a vehicle inner side of a vehicle is capable of protecting a head of an occupant and is deployed and inflated so as to cover the vehicle inner side of the window by allowing an inflation gas to flow in.

BACKGROUND

In the related art, there has been a head protection airbag device, in which an airbag stored on an upper edge side of a window on a vehicle inner side of a vehicle includes a bag body deployed and inflated so as to cover the vehicle inner side of the window when an inflation gas flows in, and straps each connected to the bag body so as to generate tension along a front-rear direction in order to improve a restraint performance of an occupant on the inner side after the inflation (for example, see JP-A-2000-355261 (see FIGS. 1 to 8) and the specification of US Patent Application Publication 2010/0013203). In the strap, an upper end portion is attached to an upper frame of a window frame on the upper edge side of the window, a lower end portion is attached to a lateral frame of the window frame on a lateral edge side of the window, and a portion (intermediate portion) between the upper end portion and the lower end portion is connected to the bag body. When the bag body is stored on the upper edge side of the window, the strap is stored from an upper frame side to a lateral frame side, and with the inflation of the bag body, the intermediate portion is extended toward a central side of the window to generate tension in the bag body along the front-rear direction. The strap described in JP-A-2000-355261 (see FIGS. 1 to 8) covers the vehicle inner side of an upper lateral cell of the bag body from the upper end portion, penetrates from the vehicle inner side of the bag body to a vehicle outer side, and covers the vehicle outer side of an intermediate lateral cell in an intermediate position in an upper-lower direction. Then, the strap penetrates from the vehicle outer side of the bag body to the vehicle inner side, covers the vehicle inner side of the lower lateral cell, and penetrates from the vehicle inner side of the bag body to the vehicle outer side. An area from the intermediate portion of the strap, which is a penetrating portion, to a lower end side portion extends forward from a front end of the bag body and is connected to a front pillar portion, and the strap penetrates the bag body multiple times. Therefore, because of the inflation of the plurality of lateral cells (upper lateral cell, intermediate lateral cell, and lower lateral cell), a substantial length of the strap can be shortened, and the bag body is pulled forward at the portion from the intermediate portion of the strap to the lower end portion extending forward, causing tension in the bag body. Further, in the specification of US Patent Application Publication 2010/0013203, the bag body includes a ring (sliding member) made of rigid metal or the like on the vehicle inner side of the intermediate portion in the upper-lower direction in which the bag body is deployed and inflated, and the strap is configured such that the upper end portion to the lower end portion are disposed on the vehicle outer side of the bag body and the intermediate portion is submerged in the ring. After the deployment and the inflation of the bag body, the ring is disposed in the vicinity of the center of the window, and the strap is pulled in an L shape; conversely, the ring to which the strap is connected is indirectly pulled by the strap to generate tension in the bag body.

SUMMARY

However, in the related-art airbag described in JP-A-2000-355261 (see FIGS. 1 to 8), since the strap penetrates the bag body multiple times from the upper end portion to the intermediate portion, a problem arises in quickly deploying the bag body in consideration of a frictional resistance of the strap. In the airbag described in the specification of US Patent Application Publication 2010/0013203, when the bag body is deployed, since the strap slides in the ring, although the bag body can be deployed smoothly, there is a need to provide a separate ring in the bag body, which causes an increase in the number of components. Further, since the strap is merely disposed on the vehicle outer side of the bag body and a substantial length dimension of the strap is not shortened by utilizing the inflation of the cells as in JP-A-2000-355261 (see FIGS. 1 to 8), a problem arises in generating sufficient tension in the bag body.

The present embodiment solves the above-described problem, and an object thereof is to provide a head protection airbag device capable of rapidly deploying a bag body and generating sufficient tension in the bag body without using a separate component.

A head protection airbag device of the present embodiment comprising:

an airbag stored on an upper edge side of a window on a vehicle inner side of a vehicle and including a bag body deployed and inflated to cover the vehicle inner side of the window during an inflow of an inflation gas, and a strap in which an upper end portion is attached to an upper frame of a window frame on an upper edge side of the window, a lower end portion is attached to a lateral frame of the window frame on a lateral edge side of the window, and a portion between the upper end portion and the lower end portion is connected to the bag body, such that tension is generated in the bag body along a front-rear direction after the inflation, wherein when the strap is stored on the upper edge side of the window of the bag body, the strap is stored from an upper frame side to a lateral frame side, and with the inflation of the bag body, the portion between the upper end portion and the lower end portion is extended toward a central side of the window to generate tension in the bag body along the front-rear direction, wherein in the bag body, after the inflation, a non-inflation portion is disposed in a vicinity of a lower side of an attachment position of the upper end portion of the strap to the upper frame and in a vicinity of a side of an attachment position of the lower end portion of the strap to the lateral frame, and an insertion hole through which the strap is inserted and which penetrates in a vehicle inner-outer direction is formed in the non-inflation portion, and an inflation portion is disposed at a portion from the insertion hole to the lower end portion, wherein in the strap, an insertion portion through which the insertion hole of the bag body is inserted is disposed at a portion between the upper end portion and the lower end portion, and an area from the upper end portion to the insertion portion is defined as a vehicle outer side portion disposed on a vehicle outer side of the bag body in a inflation completed state, and an area from the insertion portion to the lower end portion is defined as a vehicle inner side portion disposed on a vehicle inner side of the bag body in the inflation completed state, and wherein after the inflation of the bag body, the vehicle inner side portion is configured to be pressed to the vehicle inner side by the inflation portion to generate the tension in the strap.

In the head protection airbag device of the present embodiment, the bag body is deployed and inflated, the insertion hole is extended to the central side of the window, the strap is also pulled to a peripheral edge of the insertion hole from a state in which the strap is stored from the upper frame of the window frame to the lateral frame accompanying the deployment of the bag body, and a vicinity of the insertion portion is extended to the central side of the window. Then, when the bag body is inflated and the inflation portion is inflated, the vehicle inner side portion from the insertion portion to the lower end portion of the strap is pressed to the vehicle inner side by the inflation portion, and a substantial length dimension in the front-rear direction of the vehicle inner portion from the insertion portion of the strap to the lower end portion is shortened, a portion of the bag body from an insertion hole peripheral edge to the lower end portion is pulled toward the lower end portion side while being pressed toward the lateral frame side. Therefore, sufficient tension is generated in the bag body along the front-rear direction. Further, when the bag body is deployed from the upper edge side of the window where the bag body is stored, the strap is disposed in a substantially upper-lower direction from the upper end portion to the insertion portion and then on the vehicle outer side of the bag body. Friction resistance with the bag body can be reduced as much as possible without providing a separate component such as a ring, so that it is unlikely to exert an operation of reducing the deployment of the bag body.

Therefore, in the head protection airbag device according to the present embodiment, the bag body can be rapidly deployed, and sufficient tension can be generated in the bag body without using a separate component.

Then, in the head protection airbag device according to the present embodiment, it is desirable that the strap is disposed in front of and behind the bag body so that the insertion hole of the non-inflation portion and the inflation portion correspond to each other.

In such a configuration, the strap that generates tension in the bag body is disposed in front of and behind the bag body, so that more sufficient tension can be generated in the bag body.

Further, in the head protection airbag device according to the present embodiment, it is desirable that the bag body is stored on the upper edge side of the window in a folded manner, in which an area from the lower edge side after the inflation to a disposition region of the insertion hole is formed into a roll-folded portion folded by roll-folding such that the lower edge side comes close to the upper edge side, or is formed into a bellows-folded portion folded in the upper-lower direction, and the upper side of the disposition region of the insertion hole is formed as a bellows-folded portion folded in the upper-lower direction.

In such a configuration, when the vehicle outer side portion from the upper end portion to the insertion portion of the strap is disposed on the vehicle outer side of the bellows-folded portion, and the vehicle inner side portion from the insertion portion to the lower end portion extending in a lateral direction is pulled out in the lateral direction, substantially an entire length of the strap can be stored along the lateral frame from the upper frame of the window frame without folding the strap into a folded portion of the bag body. Therefore, a length dimension of the strap from the attachment position on the upper frame side of the window frame where the bag body can be stored when the bag body is stored to the attachment position of the lateral frame can be set to be the shortest. Thereafter, when the bag body is deployed, the strap can be maintained in the set short state, and because of a behavior of shortening the substantial length dimension by pressing the inflation portion to the vehicle inner side, tension is generated in the strap, and the tension can be accurately generated in the bag body along the front-rear direction. Further, in a case where the folded bag body is roll-folded below the insertion hole, for example, if the roll-folding is outward roll-folding, even when the bag body is deployed along the window and an occupant comes close to the window at the time of deployment, the bag body can be deployed at a position on a window side with respect to the occupant, and the lower edge side of the bag body can be smoothly disposed between the window and the occupant. Further, if the roll folding is inward roll-folding, in a case where there is a projection on the lower side in a vicinity of the vehicle inner side of the window, the bag body at the time of deployment is separated from the window and is easily deployed on the vehicle inner side, and thus the bag body can be smoothly deployed on the vehicle inner side of the projection without interfering with the projection. Further, if the folded bag body is bellows-folded on the lower side of the insertion hole, the folded bag body can be quickly deployed when the bag body is to be deployed, which is suitable when the airbag covers the vehicle inner side of the large window.

Further, in the head protection airbag device according to the present embodiment, it is preferable that the bag body includes an inflation portion that presses the vehicle inner side portion toward the vehicle inner side after the inflation, inflation portions are annularly arranged along an entire periphery of the window frame, and a lower edge side inflation portion on the lower edge side is disposed so as to cover the vehicle inner side of the lower frame of the window frame and to be supported by the lower frame.

In such a configuration, when the inflation of the bag body is completed, since the lower edge side inflation portion is supported by the vehicle inner side of the lower frame of the window frame and prevented from jumping out to the vehicle outer side of the window, even if the occupant hits the lower edge side of the bag body, the occupant can be restrained in a vehicle interior.

In this case, in the head protection air bag device according to the embodiment, the bag body is disposed so as to cover the vehicle inner side of the window having a substantially quadrangular shape and surrounded by the window frame including an upper frame, a lower frame, and front and rear lateral frames connecting the upper frame and the lower frame.

That is, in such a configuration, even if the bag body covers the large window having the substantially quadrangular shape such as a window at a side of a driver seat of a large vehicle (for example, a large bus), the tension in the front-rear direction can be generated after the inflation, and the driver is prevented from being thrown out to the outside of the vehicle, so that the driver of the large bus can be suitably protected.

DESCRIPTION OF EMBODIMENTS

Figure 1:
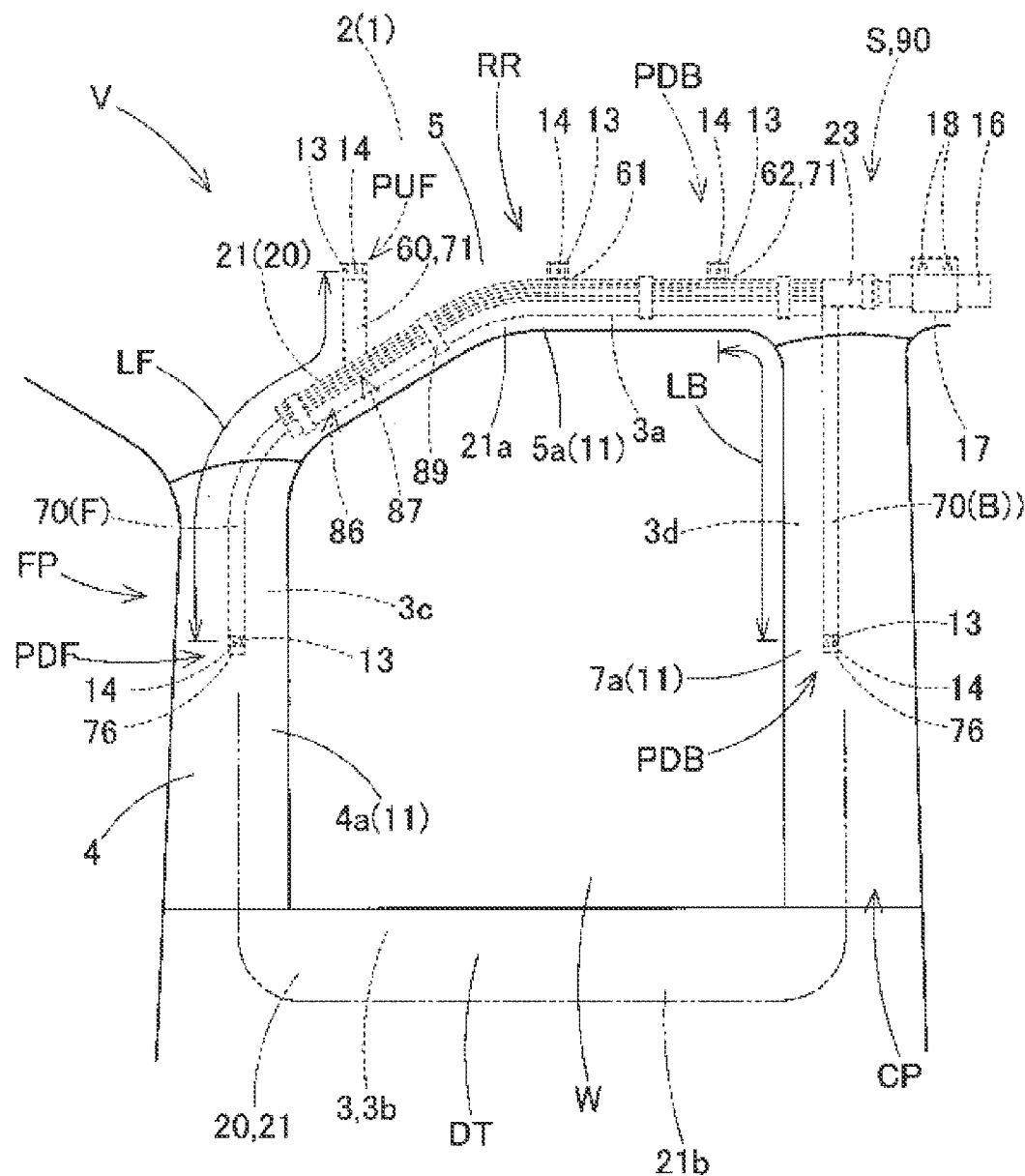
FIG. 1 is a schematic front view of a vehicle-mounted state of a head protection airbag device according to an embodiment of the present embodiment as viewed from a vehicle inner side.

Hereinafter, an embodiment of the present invention will be described with reference to the drawings, and as illustrated in FIG. 1, a head protection airbag device S of the embodiment includes an airbag 20, an inflator 16 that discharges an inflation gas G (see FIG. 6), an airbag cover 11, and attaching brackets 13, 17. The airbag 20 is stored in a folded manner in a range from a rear edge side of a front pillar portion FP to a front edge side of an intermediate pillar portion CP on an upper edge side of a window W provided on a vehicle inner side I of a vehicle V (see FIGS. 7 and 8).

Incidentally, the vehicle V on which the head protection airbag device S of the embodiment is mounted is a large bus, and a large window W having a substantially quadrangular shape is disposed on a side of a driver seat.

As illustrated in FIG. 1, the inflator 16 of the head protection airbag device S, which is a substantially cylindrical cylinder type, is inserted into a connection port portion 23 for allowing the inflation gas G to flow into a bag body 21 of the airbag 20, and is connected to the bag body 21. The inflator 16 is held by the attaching bracket 17, and by fastening the attaching bracket 17 with bolts 18, the inflator 16 is attached and fixed to an inner panel 2 of a roof side rail portion RR in a vicinity of an upper side of the intermediate pillar portion CP by being covered with a lower edge 5*a* of a roof head lining 5.

The inner panel 2 is a member on a body (vehicle body) 1 side of the vehicle V. and is a portion constituting a window frame 3 on a peripheral edge of the window W. In the case of the embodiment, the window frame 3 includes an upper frame 3*a* on a roof head lining 5 side provided on the upper edge side of the window W, a lower frame 3*b* on a door trim DT side provided on a lower edge side of the window W, a lateral frame 3*c* on a front pillar portion FP side provided on a lateral front edge side of the window W, and a lateral frame 3*d* on an intermediate pillar portion CP side provided on a lateral rear edge side of the window W, and is disposed in a substantially quadrangular annular shape on the peripheral edge of the window W having the substantially quadrangular shape.

The inflator 16 is operated by a predetermined control device that detects a side collision of the vehicle V. The output of the inflator 16 corresponds to a capacity of the airbag 20 (specifically, the bag body 21), and is set such that an inflation portion 24 of the bag body 21, which will be described later, can maintain a predetermined internal pressure from a time of the side collision of the vehicle V to a time of rollover.

The attaching brackets 13 use attachment bolts 14 to attach and fix respective attachment piece portions 60, 61, 62, which will be described later, of the airbag 20 to the inner panel 2. Each of the attachment bolts 14 is fastened to a screw hole provided with a nut or the like in the inner panel 2.

As illustrated in FIG. 1, the airbag cover 11 includes a rear edge 4*a* side of a front pillar garnish 4 disposed in the front pillar portion FP, a lower edge 5*a* side of the roof head lining 5 disposed in the roof side rail portion RR, and a front edge 7*a* of an intermediate pillar garnish 7 disposed in the intermediate pillar portion CP.

The airbag 20 includes the bag body 21 deployed and inflated so as to cover the vehicle inner side of the window W when the inflation gas G flows in, and straps 70 (F, B) connected to the bag body 21 and generating tension along a front-rear direction when the bag body 21 is deployed and inflated.

As illustrated in FIGS. 1 to 5, the bag body 21 includes a gas inflow portion 22 that is deployed from a folded state by the inflation gas G flowing from the inflator 16 and is deployed and inflated so as to cover the vehicle inner side of the window W, and is deployed by the inflation gas G so as to separate a vehicle inner side wall portion 22*a* and a vehicle outer wall portion 22*b* that face each other, and a non-inflow portion 45, as a non-inflation portion, that does not allow the inflation gas G to flow in by causing the vehicle inner side wall portion 22*a* and the vehicle outer wall portion 22*b* to be connected. The bag body 21 is manufactured by bag weaving from yarns such as polyamide and polyester.

The gas inflow portion 22 includes the connection port portion 23 connected to the inflator 16 and the inflation portion 24 communicating with the connection port portion 23.

The inflation portion 24 includes a peripheral edge inflation portion 25 having a substantially quadrangular annular shape and disposed on an outer peripheral edge of the bag body 21, and a central side inflation portion 35 disposed on a central side of the bag body 21 that is surrounded by the peripheral edge inflation portion 25. The peripheral edge inflation portion 25 includes an upper edge side inflation portion 26 disposed on the vehicle inner side I of the upper frame 3a of the window frame 3, a front edge side inflation portion 27 disposed on the vehicle inner side I of a front lateral frame 3c, a lower edge side inflation portion 28 disposed on the vehicle inner side I of the lower frame 3b, and a rear edge side inflation portion 29 disposed on the vehicle inner side I of a rear lateral frame 3d after the deployment and the inflation of the bag body 21 (see FIGS. 6 to 8). A front end 26a side of the upper edge side inflation portion 26 intersects and communicates with an upper end 27a of the front edge side inflation portion 27, a lower end 27b of the front edge side inflation portion 27 intersects and communicates with a front end 28a of the lower edge side inflation portion 28, a rear end 28b of the lower edge side inflation portion 28 intersects and communicates with a lower end 29b of the rear edge side inflation portion 29, and an upper end 29a of the rear edge side inflation portion 29 intersects and communicates with a rear end 26b of the upper edge side inflation portion 26. Further, the connection port portion 23 is disposed so as to extend rearward from an intersection of the rear end 26b of the upper edge side inflation portion 26 and the upper end 29a of the rear edge side inflation portion 29.

The central side inflation portion 35 includes communication inflation portions 36, 37 arranged side by side in the front-rear direction so as to make the upper edge side inflation portion 26 communicate with the lower edge side inflation portion 28, and a branch inflation portion 39 communicating with the communication inflation portions 36, 37 at an intermediate portion in an upper-lower direction of the communication inflation portions 36, 37. Upper ends 36a, 37a of the communication inflation portions 36, 37, which communicate with the upper edge side inflation portion 26, are located rearward of lower ends 36b, 37b that communicate with the lower edge side inflation portion 28.

The non-inflow portion 45 includes a peripheral edge portion 46 disposed on the outer peripheral edge of the bag body 21, and closing portions 47, 49, 51, 52, and 53 disposed in a region of the central side inflation portion 35. Attachment piece portions 60, 61, and 62 for attaching the bag body 21 to an upper frame 3a side of the window frame 3 are disposed on an upper edge 46a side of the peripheral edge portion 46. The attaching bracket 13 are fixed to the attaching pieces 60, 61, and 62, respectively, and attachment holes 60a, 61a, and 62a through which the attachment bolts 14 are inserted are formed in the attachment piece portions 60, 61, and 62, respectively. In the case of the embodiment, the attaching piece portions 60, 62 on a front end side and a rear end side are shared with upper end portions 71 of the straps 70F, 70B. Further, the attachment piece portion 60 shared with the upper end portion 71 of the strap 70F is disposed near a rear side of the front edge side inflation portion 27 (specifically, above the closing portion 47 which will be described later), and the attachment piece portion 62 shared with the upper end portion 71 of the strap 70B is disposed near a front side of the rear edge side inflation portion 29 (specifically, above the closing portion 49 which will be described later).

The closing portion 47 is disposed in a substantially triangular region between the front edge side inflation portion 27 and the communicating inflation portion 36 below the upper edge side inflation portion 26, and the closing portion 49 is disposed between the upper edge side inflation portion 26 and the lower edge side inflation portion 28 in a substantially triangular region between the rear edge side inflation portion 29 and the communication inflation portion 37. The closing portion 51 is disposed below the closing portion 47, and the closing portions 52, 53 are disposed below the upper edge side inflation portion 26 and above the lower edge side inflation portion 28 in upper and lower regions of the branch inflation portion 39 between the communication inflation portions 36, 37.

Further, insertion holes 48, 50 are provided in the closing portions 47, 49 as the non-inflation portions so as to penetrate the front and back surfaces (the vehicle inner side I and a vehicle outer side O) of the bag body 21. The insertion holes 48, 50 are each opened in a substantially circular shape in a vicinity of an intermediate position of the bag body 21 in the upper-lower direction, and set at the same height position from a lower edge 21b of the bag body 21. Further, the through hole 48 is disposed in a vicinity of a position immediately below the upper end portion 71 of the strap 70F (which will be described later) shared with the attachment piece portion 60, the insertion hole 50 is disposed in a vicinity of a position immediately below the upper end portion 71 of the strap 70B (which will be described later) shared with the attachment piece portion 62, and lateral sides of the insertion holes 48, 50 in the left-right direction are in a vicinity of attachment positions PDF, PDB where lower end portions 76, which will be described later, of the straps 70 (F, B) are attached to the window frame 3.

In the straps 70 (F, B), the upper end portion 71 shared with the attachment piece portion 60 is attached to the upper frame 3a of the window frame 3 on the upper edge side of the window W, the lower end portions 76 are attached to the lateral frames 3c, 3d of the window frame 3 on the lateral edge sides of the window W, and a portion (intermediate portion) 73 between the upper end portion 71 and the lower end portion 76 is connected to the bag body 21. The attaching brackets 13 serving as abutting plates are attached to the upper end portion 71, the lower end portion 76, and the attachment piece portion 61, respectively, and the upper end portion 71 and the lower end portion 76 are attached to the upper frame 3a side of the window frame 3 by using the attachment bolt 14. The upper end portions 71 of the straps 70 (F, B) are each sewn at 71b to an upper edge 46a of the peripheral edge portion 46 on an upper edge 21a side of the bag body 21 in a vicinity of a lower part of an attachment hole 71a through which the attachment bolt 14 penetrates. The attachment holes 71a are the attachment holes 60a, 62a of the attachment piece portions 60, 62. Further, an attachment hole 77 through which the attachment bolt 14 is inserted is provided in the lower end portion 76.

Then, the intermediate portion 73 of the strap 70F is inserted through the insertion hole 48 of the closing portion 47 of the bag body 21 from the vehicle outer side O to the vehicle inner side I, and a portion from an insertion portion 74 inserted through the insertion hole 48 toward a lower end portion 76 side is bent so as to face forward. Therefore, in the front-side strap 70F, after the deployment and the inflation of the bag body 21, an area from the upper end portion 71 to the insertion portion 74 is defined as a vehicle outer side region 81 disposed on the vehicle outer side O of the bag body 21 in the inflation completed state, and an area from the insertion portion 74 to the lower end portion 76 is defined as a vehicle inner side region 82 disposed on the vehicle inner side I of the bag body 21 in the inflation completed state.

Further, the intermediate portion 73 of the strap 70B is inserted through the insertion hole 50 of the closing portion 49 of the bag body 21 from the vehicle outer side O to the vehicle inner side I, and the portion from the insertion portion 74 inserted through the insertion hole 50 to the lower end portion 76 side is bent so as to face rearward. Therefore, in the rear-side strap 70B, after the deployment and the inflation of the bag body 21, an area from the upper end portion 71 to the insertion portion 74 is defined as a vehicle outer side region 81 disposed on the vehicle outer side O of the bag body 21 in the inflation completed state, and an area from the insertion portion 74 to the lower end portion 76 is defined as a vehicle inner side region 82 disposed on the vehicle inner side I of the bag body 21 in the inflation completed state.

When the bag body 21 is stored on the upper edge side of the window W, the straps 70F, 70B are set to a length dimension that allows the straps 70F, 70B to be stored from the upper frame 3a side to lateral frames 3c, 3d sides and to be bent from the upper frame 3a side to the lateral frames 3c, 3d sides.

However, in each of the straps 70F, 70B, after the inflation of the bag body 21, the vehicle inner side portion 82 from the insertion portion 74 inserted into each of the insertion holes 48, 50 to the lower end portion 76 is pressed and curved toward the vehicle inner side I by the front edge side inflation portion 27 or the rear edge side inflation portion 29 as an inflation portion, and a substantial length dimension in the front-rear direction is shortened. Therefore, tension for pulling a front side insertion hole peripheral edge 47b of the closing portion 49 forward and tension for pulling a rear side insertion hole peripheral edge 49b of the closing portion 49 rearward are generated.

Figure 2:
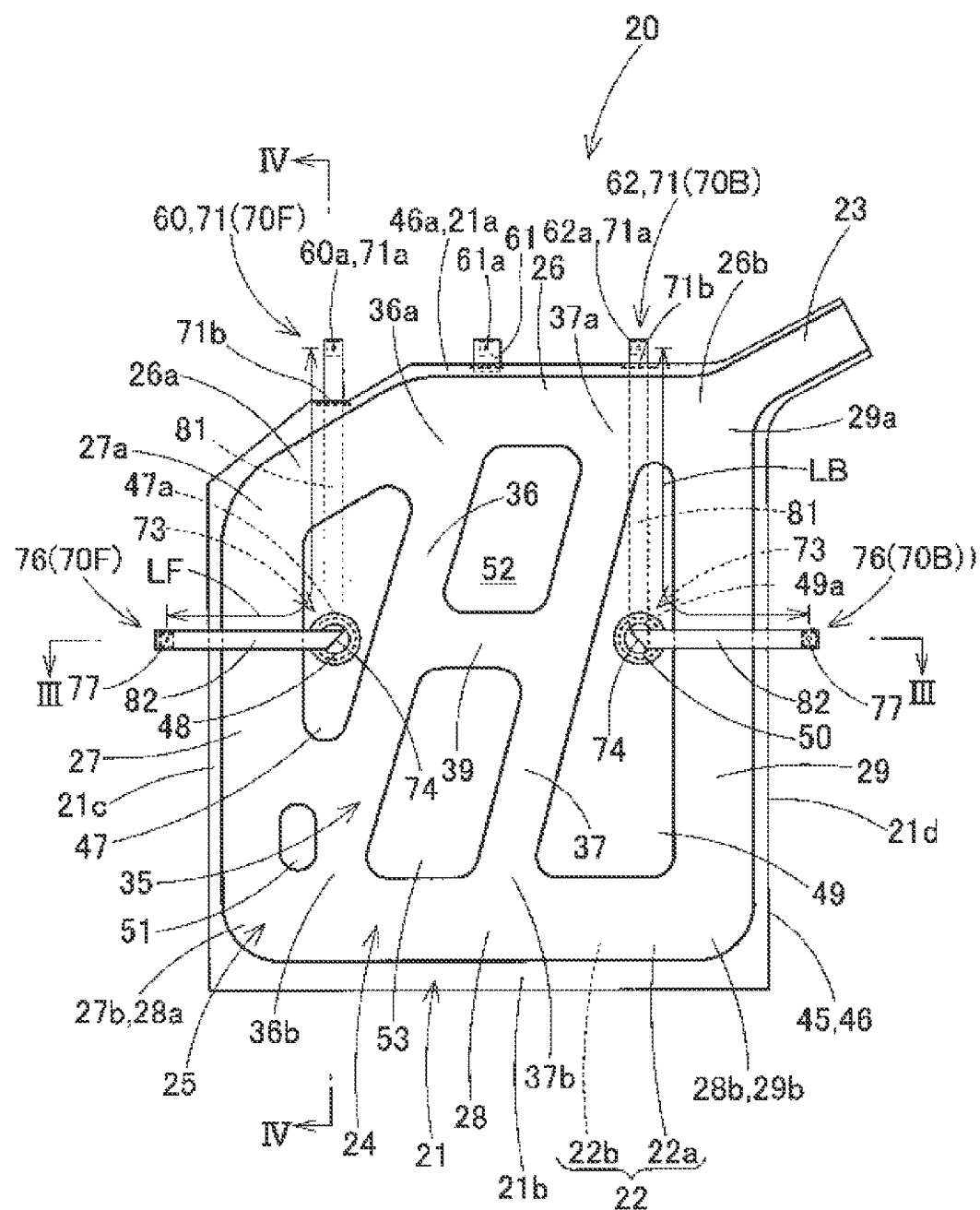
FIG. 2 is a front view of a state in which an airbag of the head protection airbag device according to the embodiment is flatly deployed.
Figure 3:
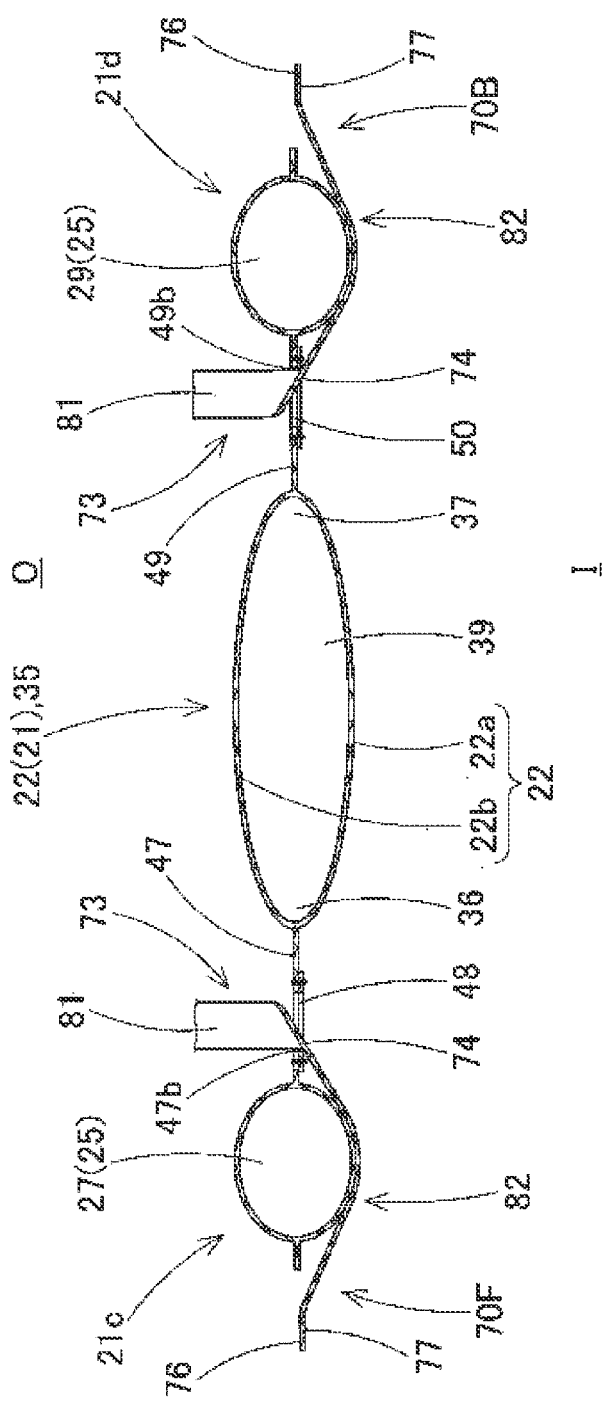
FIG. 3 is a cross-sectional view taken along a line III-III in FIG. 2 and illustrating a state in which the bag body according to the embodiment is inflated alone.
Figure 4:
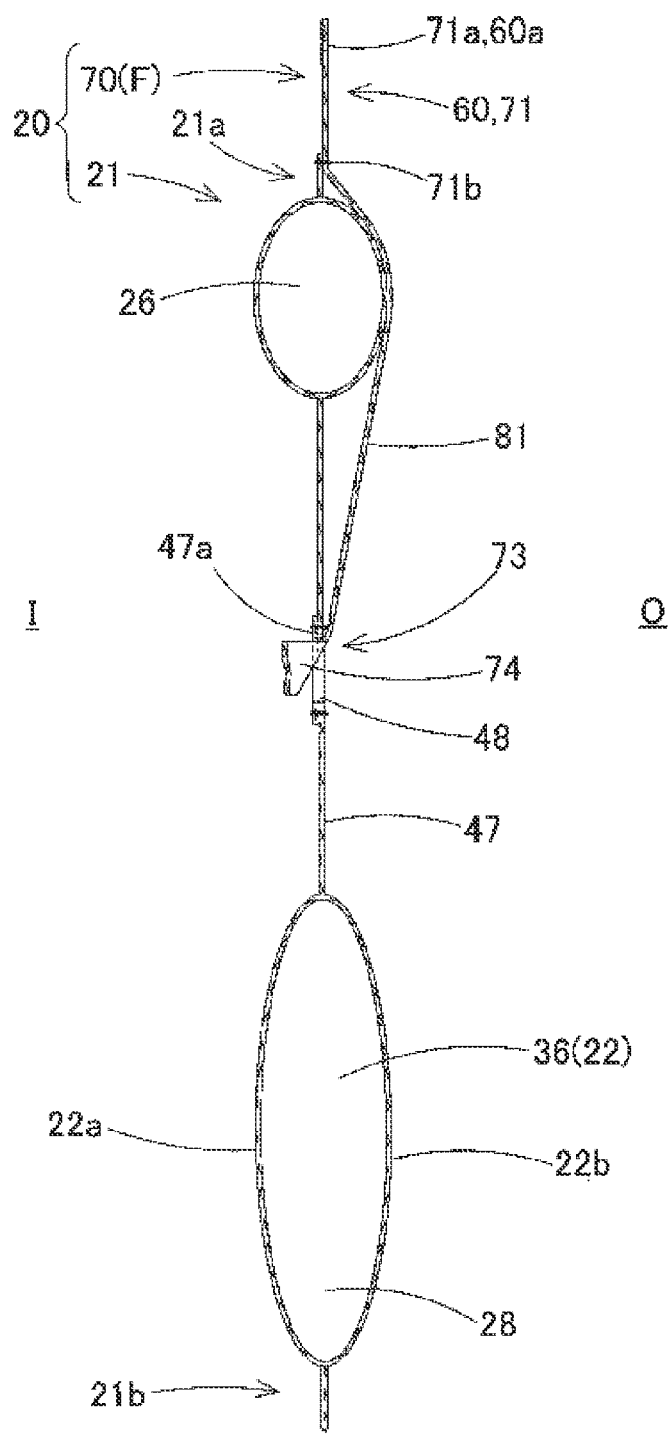
FIG. 4 is a cross-sectional view taken along a line IV-IV in FIG. 2 and illustrating a state in which the bag body according to the embodiment is inflated alone.

In mounting the head protection airbag device S of the embodiment on the vehicle V, first, the airbag 20 is folded. At the time of folding, as illustrated in FIG. 2, the bag body 21 is flatly deployed in advance, and on a strap 70F side, the vehicle outer side portion 81 extending downward from the upper end portion 71 shared with the attachment piece portion 60 is disposed on the vehicle outer side O of the flatly deployed bag body 21, the insertion portion 74 of the strap 70F is inserted into the insertion hole 48 from the vehicle outer side O to the vehicle inner side I, and the vehicle inner side portion 82 facing the lower end portion 76 from the insertion portion 74 is disposed so as to face forward along the front-rear direction. Further, on the strap 70B side, the vehicle outer side portion 81 extending downward from the upper end portion 71 shared with the attachment piece portion 62 is disposed on the vehicle outer side O of the flatly deployed bag body 21, the insertion portion 74 of the strap 70B is inserted into the insertion hole 50 from the vehicle outer side O to the vehicle inner side I, and the vehicle inner side portion 82 facing the lower end portion 76 from the insertion portion 74 is disposed so as to face rearward along the front-rear direction.

Then, the bag body 21 is folded. In this folding, a roll-folded portion 86 is formed by roll-folding an area from the lower edge 21b side of the bag body 21 after the inflation to a disposition region of the insertion holes 48, 50 such that the lower edge 21b side comes close to the upper edge 21a side, and a bellows-folded portion 87 is formed by folding an upper side of the disposition region of the insertion holes 48, 50 in the upper-lower direction (see FIG. 5). In the case of the embodiment, the roll-folding of the roll-folded portion 86 is outward roll-folding in which the lower edge 21b side of the bag body 21 is wound toward the vehicle outer side O. Further, in the strap 70F, an upper end portion 71 side is disposed on the vehicle outer side O of a bellows-folded portion 87, and the lower end portion 76 side inserted into the insertion hole 48 is extended forward from an upper surface 86a side of the roll-folded portion 86. In the strap 70B, an upper end portion 71 side is disposed on the vehicle outer side O of the bellows-folded portion 87, and the lower end portion 76 side inserted into the insertion hole 50 is extended rearward from an upper surface 86a side of the roll-folded portion 86. After the airbag 20 is folded, the folded airbag 20 is wrapped with a wrapping material 89 for preventing folding collapse.

Figure 5:
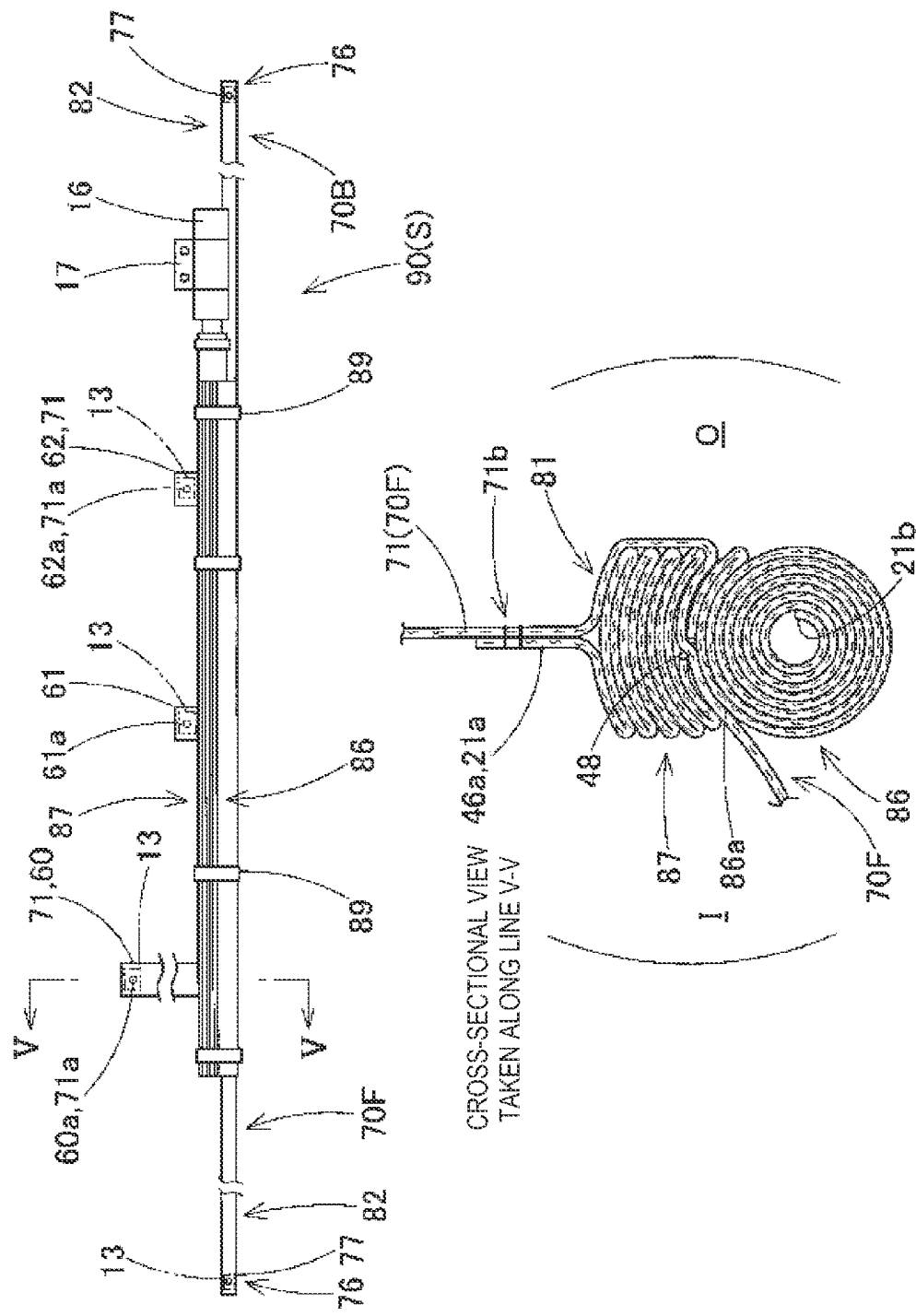
FIG. 5 is a diagram illustrating a folded state of the airbag according to the embodiment.

Thereafter, the inflator 16 to which the attaching bracket 17 is attached is connected to the connection port portion 23 of the airbag 20, and the attaching brackets 13 are attached to the attachment piece portions 60, 61 and 62 of the airbag 20 and the lower end portion 76 to form an airbag assembly 90 (see FIG. 5).

Thereafter, the attachment piece portions 60, 61, 62 and the lower end portion 76 to which the attaching brackets 13 are assembled are disposed at corresponding attachment portions of the inner panel 2 on the body I side, and inserted into the attachment holes 60a, 61a, 62a, and 77, the attachment bolt 14 is fastened to the screw hole of the inner panel 2, the attaching bracket 17 is fastened with the bolts 18, the inflator 16 is fixed to the inner panel 2, and the airbag assembly 90 is attached to a body 1. Then, if a lead wire (not illustrated) extending from a predetermined control device for operating the inflator is connected to the inflator 16, and the pillar garnishes 4, 7, and the roof head lining 5 are attached to the body 1, the head protection airbag device S can be mounted on the vehicle V.

Figure 6:
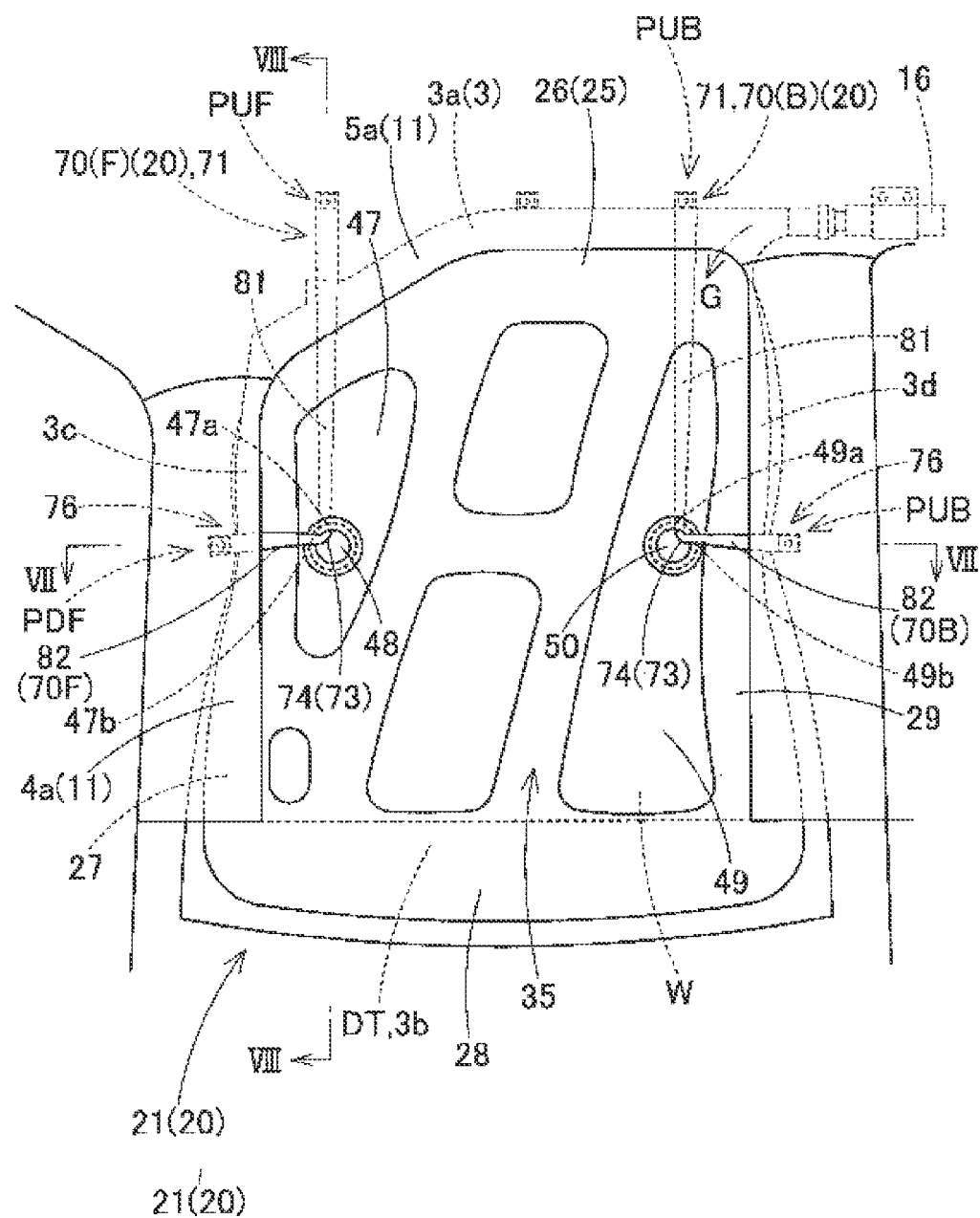
FIG. 6 is a schematic front view illustrating a state in which the head protection airbag device according to the embodiment is operated as viewed from the vehicle inner side.
Figure 7:
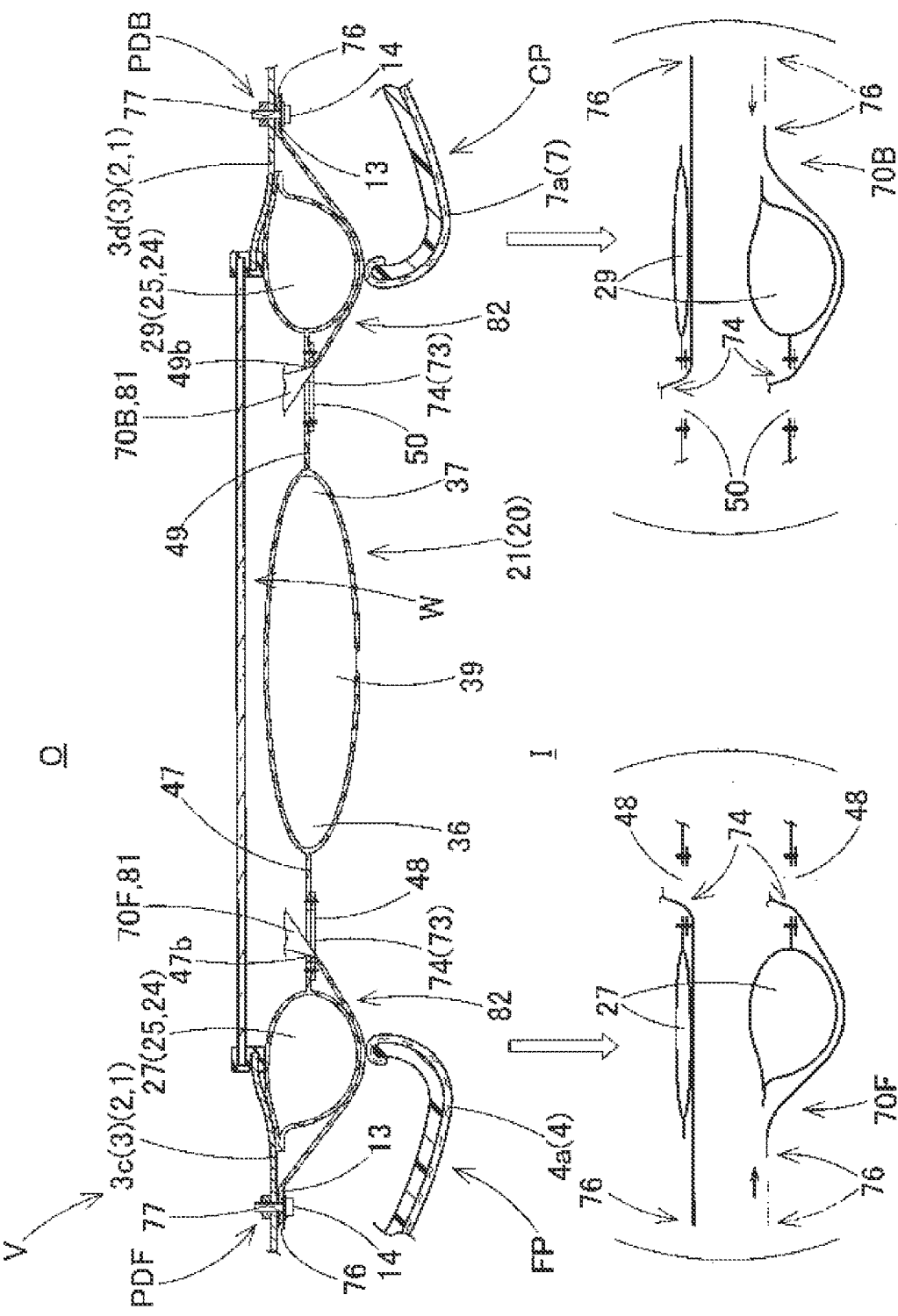
FIG. 7 is a schematic cross-sectional view taken along a line VII-VII in FIG. 6 and illustrating a state in which the head protection airbag device according to the embodiment is operated.
Figure 8:
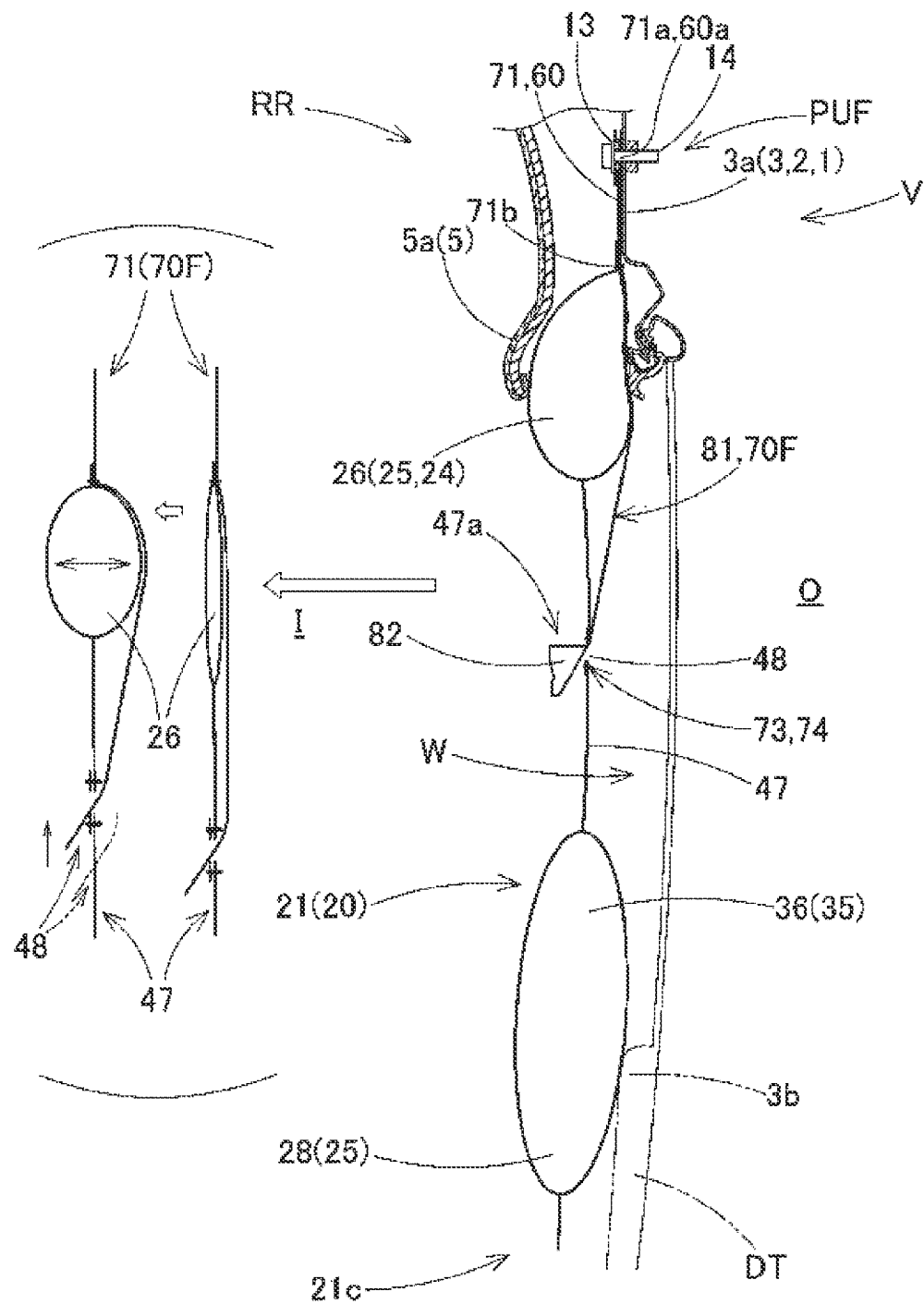
FIG. 8 is a schematic cross-sectional view taken along a line VIII-VIII in FIG. 6 and illustrating the state in which the head protection airbag device according to the embodiment is operated.

When the inflator 16 is operated to discharge the inflation gas G at the time of the side collision of the vehicle V after the head protection airbag device S of the embodiment is mounted on the vehicle V, the inflation gas G flows from the connection port portion 23 to the peripheral edge inflation portion 25 and the central side inflation portion 35, and the bag body 21 is deployed and inflated to cover the vehicle inner side I of the window W (see FIGS. 6 to 8).

In the head protection airbag device S of the embodiment, the bag body 21 is deployed and inflated, the insertion holes 48, 50 are extended to a central side of the window W, and the straps 70F, 70B are also pulled to peripheral edges 47a, 47b, 49a, and 49b of the insertion holes 48, 50 from the state of being stored from the upper frame 3a of the window frame 3 to the lateral frames 3c, 3d accompanying the deployment of the bag body 21, and the vicinity of the insertion portion 74 is extended to the central side of the window W. Then, when the bag body 21 is inflated, and the front edge side inflation portion 27 and the rear edge side inflation portion 29 as the inflation portions are inflated, the vehicle inner side portion 82 from the insertion portion 74 to the lower end portion 76 of each of the straps 70F, 70B is pressed to the vehicle inner side I by the front edge side inflation portion 27 or the rear edge side inflation portion 29 as the inflation portion, and a substantial length dimension in the front-rear direction of the vehicle inner side portion 82 from the insertion portion 74 of each of the straps 70F, 70B to the lower end portion 76 is shortened (see parentheses in FIG. 7), the portion of the bag body 21 from the insertion hole peripheral edge 47b or 49b to the lower end portion 76 (front edge side inflation portion 27 or rear edge side inflation portion 29) is pulled toward the lower end portion 76 side while being pressed toward the lateral frame 3c or 3d. Therefore, sufficient tension is generated in the bag body 21 along the front-rear direction. In addition, in each of the straps 70F, 70B, the vicinity of the insertion portion 74 on a vehicle outer side portion 81 side in which the upper end portion 71 is fixed to an attachment position PUF or PUB is pulled downward by the upper peripheral edge 47a or 49a of the insertion hole 48 or 50 in the bag body 21 in which the deployment and inflation downward from the upper edge side of the window W are completed, and is not extended to the vehicle inner side I from the insertion hole 48 or 50. Therefore, the vehicle inner side portion 82 is maintained in a short length dimension, and is pressed to the vehicle inner side I by the front edge side inflation portion 27 or the rear edge side inflation portion 29 to shorten the substantial length dimension thereof, and sufficient tension along the front-rear direction is generated in the bag body 21.

Further, when the bag body 21 is deployed from the upper edge side of the window W where the bag body 21 is stored, the straps 70F, 70B are configured such that an area from the upper end portion 71 to the insertion portion 74 is disposed substantially in the upper-lower direction, and is disposed on the vehicle outer side O of the bag body 21. Friction resistance with the bag body 21 can be reduced as much as possible without providing a separate component such as a ring, so that it is unlikely to exert an operation of reducing the deployment of the bag body 21.

Therefore, in the head protection airbag device S of the embodiment, the bag body 21 can be rapidly deployed without using a separate component, and sufficient tension can be generated in the bag body 21.

In the head protection airbag device S of the embodiment, the straps 70F, 70B are disposed in front of and behind the bag body 21, so that the insertion holes 48, 50 of the closing portions 47, 49 as the non-inflation portions and the front edge side inflation portion 27 and the rear edge side inflation portion 29 as the inflation portions correspond to each other in the front and rear (symmetrical in the front-rear direction).

Therefore, in the embodiment, the straps 70F, 70B that generate tension in the bag body 21 are disposed in front of and behind the bag body 21, so that more sufficient tension can be generated in the bag body 21.

Further, in the head protection airbag device S of the embodiment, as illustrated in FIG. 5, a roll-folded portion 86 is formed by roll-folding the area from the lower edge 21b side after the inflation to a disposition region of the insertion holes 48, 50 such that the lower edge 21b side comes close to the upper edge 21a side, and the bellows-folded portion 87 is formed by folding the upper side of the disposition region of the insertion holes 48, 50 in the upper-lower direction, and thus the bag body 21 is stored on the upper edge side of the window W in a folded manner.

Therefore, in the embodiment, when the vehicle outer side portions 81 from the upper end portions 71 to the insertion portions 74 of the straps 70F, 70B are disposed on the vehicle outer side O of the bellows-folded portions 87, and the vehicle inner side portions 82 from the insertion portions 74 to the lower end portions 76 extending in a lateral direction are pulled out in the lateral direction, substantially an entire length of the straps 70F, 70B can be stored along the lateral frames 3c, 3d from the upper frame 3a of the window frame 3 without folding the straps 70F, 70B into a folded portion of the bag body 21. Therefore, length dimensions LF, LB of the straps 70F, 70B from the attachment positions PUF, PUB on the upper frame 3a side of the window frame 3 where the bag body 21 can be stored when stored to the attachment positions PDF, PDB of the lateral frames 3c, 3d can be set to be the shortest (see FIGS. 1 and 2). Thereafter, when the bag body 21 is deployed, the straps 70F, 70B can be maintained in the set short state, and because of a behavior of shortening the substantial length dimension by pressing the front edge side inflation portion 27 and the rear edge side inflation portion 29, as the inflation portions, to the vehicle inner side I, tension is generated in the straps 70F, 70B, and the tension can be accurately generated in the bag body 21 along the front-rear direction. Further, since the folded bag body 21 is roll-folded outward below the insertion holes 48, 50, even when the bag body 21 is deployed along the window W and the occupant comes close to the window at the time of deployment, the bag body 21 can be deployed at a position on a window side with respect to the occupant, and the lower edge side of the bag body can be smoothly disposed between the window and the occupant.

The roll-folding below the insertion holes 48, 50 may be inward roll-folding. In this case, when there is a projection on the lower side in a vicinity of the vehicle inner side of the window W, the bag body 21 at the time of deployment is separated from the window W and is easily deployed on the vehicle inner side, and thus the bag body 21 can be smoothly deployed on the vehicle inner side of the projection without interfering with the projection.

Figure 9:
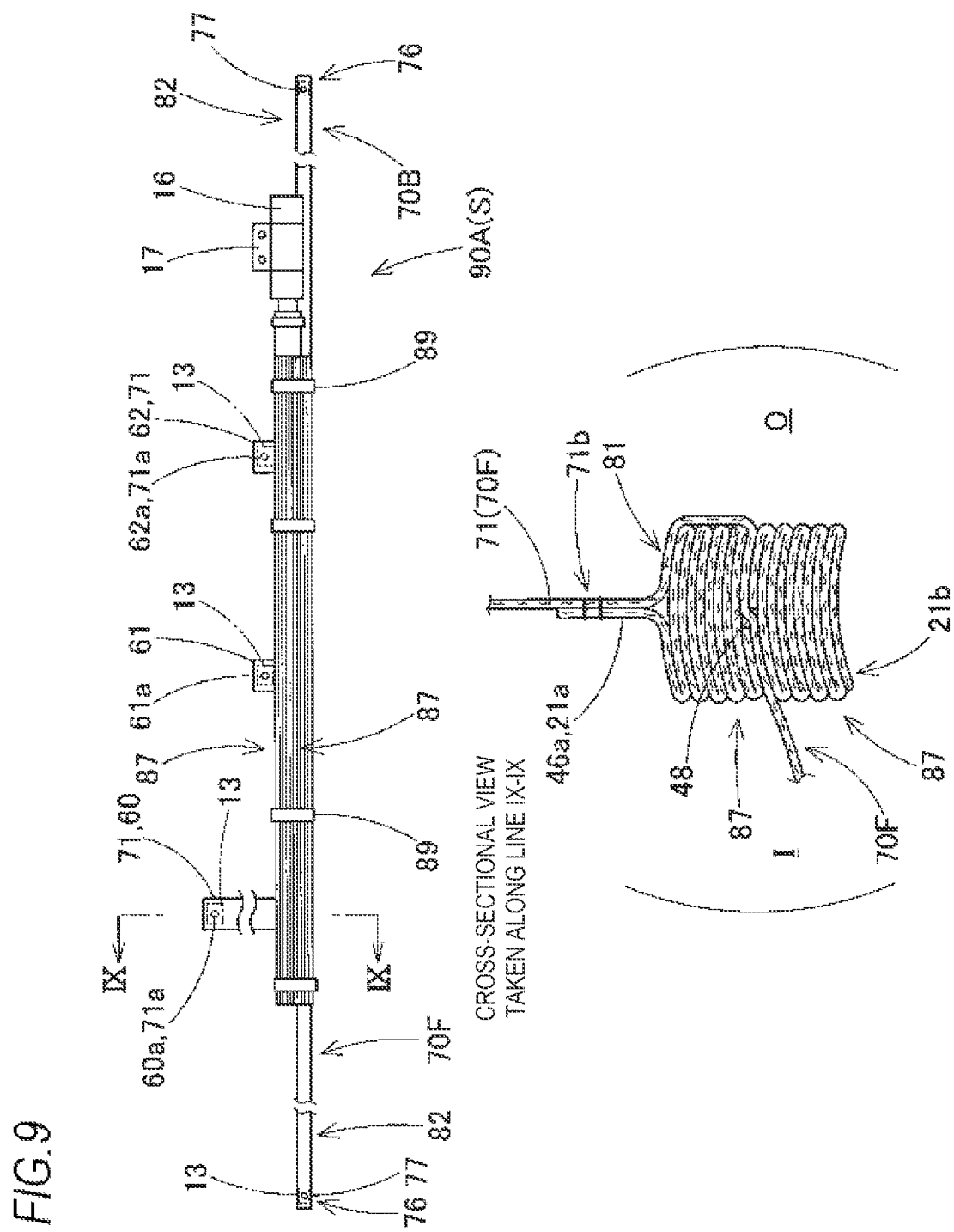
FIG. 9 is a diagram illustrating a folded state of an airbag according to a modification of the embodiment.

Further, as in an airbag assembly 90A illustrated in FIG. 9, bellows-folded portions 87 may be formed by folding the lower sides of the insertion holes 48, 50 in the upper-lower direction. In the airbag assembly 90A, since the lower sides of the insertion holes 48, 50 are also formed into the bellows-folded portion 87, 87 folded in the upper-lower direction as the upper sides, the folded bag body 21 can be quickly deployed when the bag body 21 is to be deployed, which is suitable when the airbag 20 covers the vehicle inner side I of the large window W.

Further, in the head protection airbag device S of the embodiment, the bag body 21 includes the inflation portions (the front edge side inflation portion 27 and the rear edge side inflation portion 29) that press the vehicle inner side portion 82 toward the vehicle inner side I after the inflation, the inflation portions (the upper edge side inflation portion 26, the front edge side inflation portion 27, the lower edge side inflation portion 28, and the rear edge side inflation portion 29) are annularly arranged along the entire periphery of the window frame 3, and the lower edge side inflation portion 28 on the lower edge side is disposed so as to cover the vehicle inner side I of the lower frame 3b of the window frame 3 and to be supported by the lower frame 3b.

Therefore, in the embodiment, when the inflation of the bag body 21 is completed, since the lower edge side inflation portion 28 is supported by the vehicle inner side I of the lower frame 3b of the window frame 3 and prevented from jumping out to the vehicle outer side O of the window W, even if the occupant hits the lower edge 21c side of the bag body 21, the occupant can be restrained in a vehicle interior.

In this case, in the head protection airbag device S of the embodiment, the bag body 21 is disposed so as to cover the vehicle inner side I of the window W having the substantially quadrangular shape and surrounded by the window frame 3 including the upper frame 3a, the lower frame 3b, and the front and rear lateral frames 3c, 3d connecting the upper frame 3a and the lower frame 3b.

Therefore, in the embodiment, even if the bag body 21 covers the large window W having the substantially quadrangular shape such as a window at the side of the driver seat of the large bus, the tension in the front-rear direction can be generated after the inflation, and the driver is prevented from being thrown out to the outside of the vehicle, so that the driver of the large bus can be suitably protected.

Incidentally, the central side inflation portion surrounded by the peripheral edge inflation portion on the outer peripheral edge of the bag body after the deployment and the inflation is not limited to the configuration of the embodiment as long as the insertion holes 48, 50 through which the straps 70F, 70B are inserted can be disposed.

Figure 10:
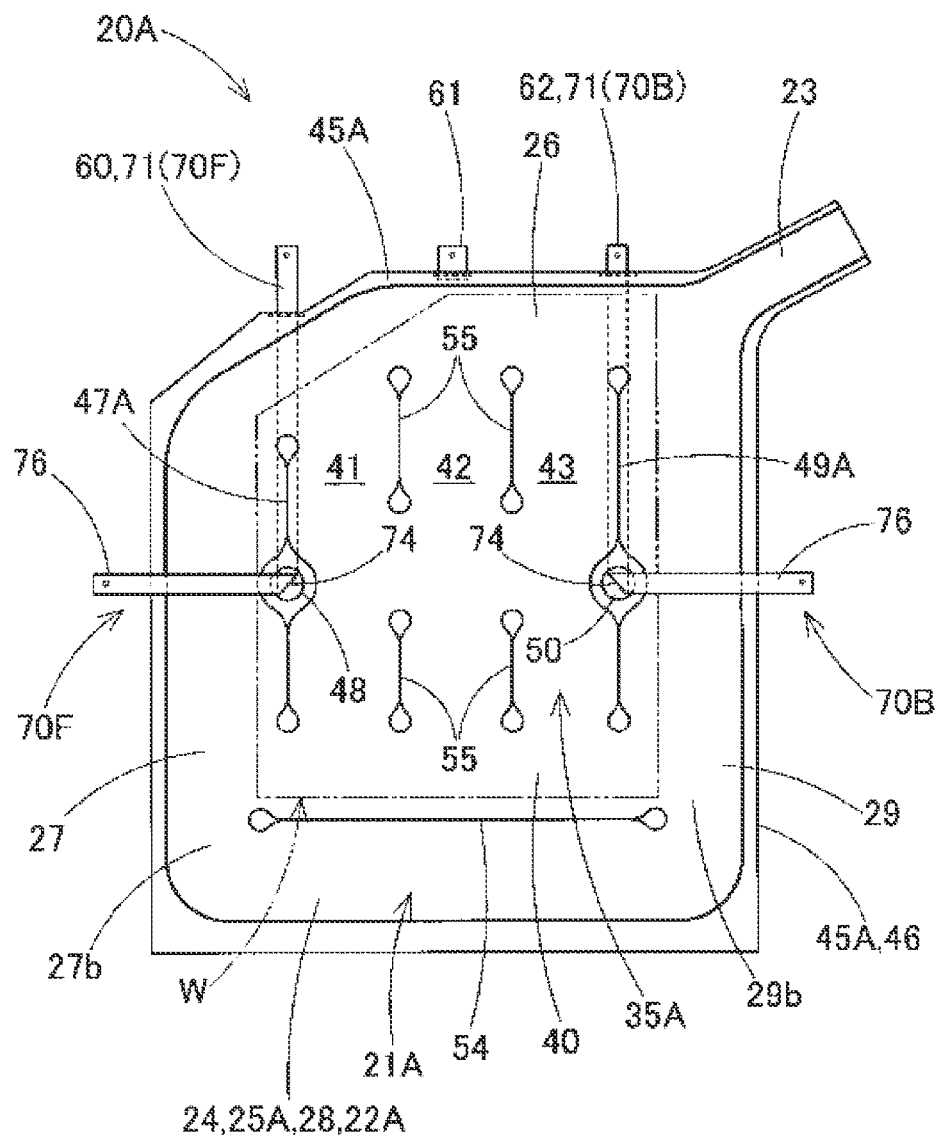
FIG. 10 is a front view of a state in which the airbag according to the modification of the embodiment is flatly deployed.

For example, as in a bag body 21A of an airbag 20A illustrated in FIG. 10, a central side inflation portion 35A includes the upper edge side inflation portion 26, the front edge side inflation portion 27, the lower edge side inflation portion 28, and the rear edge side inflation portion 29, and is surrounded by a peripheral edge inflation portion 25A communicating with the connection port portion 23. The central side inflation portion 35A includes a communication inflation portion 40 and branch inflation portions 41, 42, and 43. Similar to the embodiment, the bag body 21A covers the large window W having the substantially quadrangular shape such as the window at the side of the driver seat of the large bus.

The communication inflation portion 40 is disposed on the upper side of the closing portion 54 extending in the front-rear direction of a non-inflow portion 45A as the non-inflation portion, and allows portions in the vicinity of the lower ends 27b, 29b of the front edge side inflation portion 27 and the rear edge side inflation portion 29, which are disposed above the lower edge side inflation portion 28, to communicate with each other. The branch inflation portions 41, 42, and 43 are each disposed along the upper-lower direction and all of them are arranged side by side along the front-rear direction so as to communicate the communication inflation portion 40 with the upper edge side inflation portion 26. The insertion hole 48 through which the insertion portion 74 of the strap 70F is inserted is provided in the closing portion 47A that partitions the branch inflation portion 41 and the front edge side inflation portion 27. The insertion hole 50 through which the insertion portion 74 of the strap 70B is inserted is provided in a closing portion 49A that partitions the branch inflation portion 43 and the rear edge side inflation portion 29. Closing portions 55 disposed apart from each other in the upper-lower direction are disposed between the branch inflation portions 41, 42 and between the branch inflation portions 42, 43.

In such a bag body 21A, similar operations and effects as those in the embodiment can also be obtained in cooperation with the straps 70F, 70B.

Figure 11:
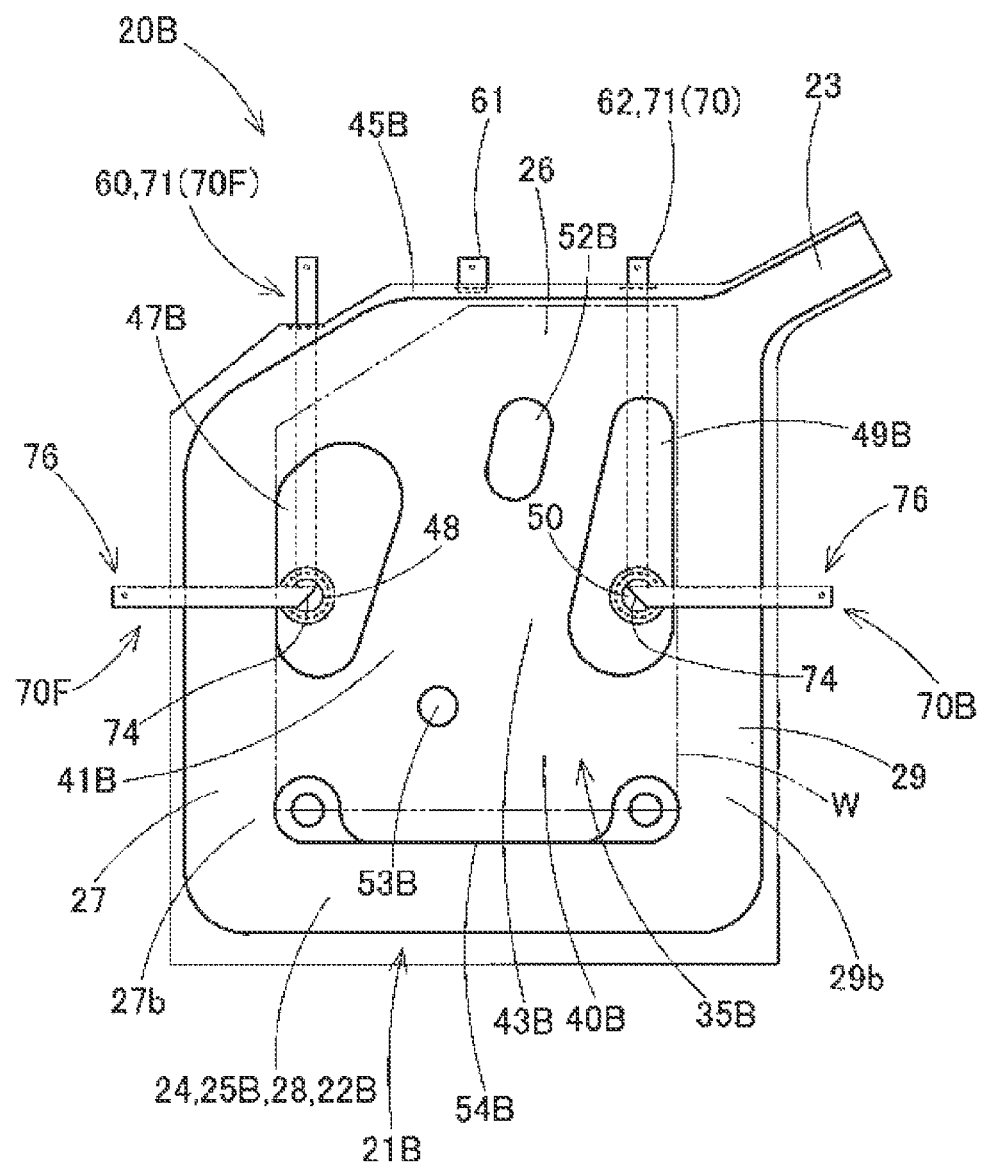
FIG. 11 is a front view of a state in which an airbag according to another modification of the embodiment is flatly deployed.

Further, in the bag body 21B of the airbag 20B illustrated in FIG. 11, a central side inflation portion 35B includes the upper edge side inflation portion 26, the front edge side inflation portion 27, the lower edge side inflation portion 28, and the rear edge side inflation portion 29, and is surrounded by the peripheral edge inflation portion 25B communicating with the connection port portion 23. The central side inflation portion 35B includes a communication inflation portion 40B and branch inflation portions 41B, 43B. Similar to the embodiment, the bag body 21B also covers the large window W having the substantially quadrangular shape such as the window at the side of the driver seat of the large bus.

The communication inflation portion 40B is disposed on an upper side of the closing portion 54B extending in a front-rear direction of a non-inflow portion 45B as the non-inflation portion, and allows portions in the vicinity of the lower ends 27b, 29b of the front edge side inflation portion 27 and the rear edge side inflation portion 29, which are disposed above the lower edge side inflation portion 28, to communicate with each other. The branch inflation portions 41B, 43B are each disposed along the upper-lower direction and both of them are arranged side by side along the front-rear direction so as to communicate the communication inflation portion 40B with the upper edge side inflation portion 26. The insertion hole 48 through which the insertion portion 74 of the strap 70F is inserted is provided in a closing portion 47B that partitions the branch inflation portion 41B and the front edge side inflation portion 27. The insertion hole 50 through which the insertion portion 74 of the strap 70B is inserted is provided in a closing portion 49B that partitions the branch inflation portion 43B and the rear edge side inflation portion 29. Closing portions 52B, 53B are disposed apart from each other in the upper-lower direction between the branch inflation portions 41B. 43B.

In such a bag body 21B, similar operations and effects as those in the embodiment can also be obtained in cooperation with the straps 70F, 70B.

In the embodiment, the insertion holes 48, 50 provided in the bag body 21 are disposed in a vicinity of substantially the middle of the bag body 21 in the upper-lower direction, but the insertion holes 48, 50 may be appropriately shifted to the upper side or the lower side, for example, to the vicinity of the lower edge of the window W, centering on the vicinity of centers in the upper-lower direction when the bag body 21 is deployed. Further, the lower end portions 76 of the straps 70 may also be appropriately shifted from the vicinity of centers in the upper-lower direction of the lateral frames 3c, 3d to the upper side or the lower side, for example, the vicinity of the lower edge of the window W.

In the embodiment, the peripheral edge inflation portion 25 of the bag body 21 of the airbag 20 has a substantially quadrangular annular shape. However, a bag body provided with a triangular annular peripheral edge inflation portion may be used to cover a window of an ordinary passenger vehicle, that is, a front side window and a rear side window, and then one strap may be disposed on a rear side of the airbag so as to be stored in a rear pillar portion from the roof side rail portion. That is, as the bag body of the airbag according to the present invention, the inflation portion surrounding the periphery edge of the window is not limited to the quadrangular annular shape, but may be a triangular annular shape. In this case, the straps may be disposed only on the rear side of the bag body, or only on the front side of the bag body, and of course, on both of the front and rear sides.

What is claimed is:
1. A head protection airbag device comprising:
an airbag stored on an upper edge side of a window on a vehicle inner side of a vehicle and including
a bag body deployed and inflated to cover the vehicle inner side of the window during an inflow of an inflation gas, and
a strap in which an upper end portion is attached to an upper frame of a window frame on the upper edge side of the window, a lower end portion is attached to a lateral frame of the window frame on a lateral edge side of the window, and a portion between the upper end portion and the lower end portion is connected to the bag body, such that tension is generated in the bag body along a front-rear direction after the inflation,
wherein when the bag body is stored on the upper edge side of the window, the strap is stored from an upper frame side to a lateral frame side, and with the inflation of the bag body, the portion between the upper end portion and the lower end portion is extended toward a central side of the window to generate tension in the bag body along the front-rear direction, wherein in the bag body, after the inflation, a non-inflation portion is disposed in a vicinity of a lower side of an attachment position of the upper end portion of the strap to the upper frame and in a vicinity of a side of an attachment position of the lower end portion of the strap to the lateral frame, and an insertion hole through which the strap is inserted and which penetrates in a vehicle inner-outer direction is formed in the non-inflation portion, and an inflation portion is disposed at a portion from the insertion hole to the lower end portion, wherein in the strap, an insertion portion which is inserted through the insertion hole of the bag body is disposed at a portion between the upper end portion and the lower end portion, and an area from the upper end portion to the insertion portion is defined as a vehicle outer side portion disposed on a vehicle outer side of the bag body in an inflation completed state, and an area from the insertion portion to the lower end portion is defined as a vehicle inner side portion disposed on a vehicle inner side of the bag body in the inflation completed state, and wherein after the inflation of the bag body, the vehicle inner side portion is configured to be pressed to the vehicle inner side by the inflation portion to generate the tension in the strap.

2. The head protection airbag device according to claim 1, wherein the strap is disposed in front of and behind the bag body so that the insertion hole of the non-inflation portion and the inflation portion correspond to each other.

3. The head protection airbag device according to claim 1, wherein the bag body is stored on the upper edge side of the window in a folded manner, in which an area from a lower edge side after the inflation to a disposition region of the insertion hole is formed into a roll-folded portion that is folded by roll-folding such that the lower edge side comes close to the upper edge side, or is formed into a bellows-folded portion that is folded in the upper-lower direction, and an upper side of the disposition region of the insertion hole is formed as a bellows-folded portion that is folded in the upper-lower direction.

4. The head protection airbag device according to claim 1, wherein the bag body includes an inflation portion that presses the vehicle inner side portion toward the vehicle inner side after the inflation, inflation portions are annularly arranged along an entire periphery of the window frame, and a lower edge side inflation portion on a lower edge side is disposed so as to cover the vehicle inner side of a lower frame of the window frame and to be supported by the lower frame.

5. The head protection airbag device according to claim 4, wherein the bag body is disposed so as to cover the vehicle inner side of the window having a substantially quadrangular shape and surrounded by the window frame including the upper frame, the lower frame, and front and rear lateral frames connecting the upper frame and the lower frame.

\* \* \* \* \*